United States Patent
Eriksson (10) Patent No.: US 9,970,806 B2
(45) Date of Patent: May 15, 2018

(54) SINGLE CONDUCTOR PROBE RADAR LEVEL GAUGE SYSTEM AND METHOD FOR A TANK HAVING A TUBULAR MOUNTING STRUCTURE

(71) Applicant: Rosemount Tank Radar AB, Gothenburg (SE)

(72) Inventor: Mikael Eriksson, Vastervik (SE)

(73) Assignee: Rosemount Tank Radar AB, Gothenberg (SE)

( * ) Notice: Subject to any disclaimer, the term of this patent is extended or adjusted under 35 U.S.C. 154(b) by 350 days.

(21) Appl. No.: 14/700,465

(22) Filed: Apr. 30, 2015

(65) Prior Publication Data

US 2016/0320224 A1  Nov. 3, 2016

(51) Int. Cl.
| | |
|---|---|
| *G01S 13/08* | (2006.01) |
| *G01F 23/284* | (2006.01) |
| *B65D 90/48* | (2006.01) |
| *G01S 7/03* | (2006.01) |
| *G01S 13/88* | (2006.01) |
| *H01Q 1/22* | (2006.01) |

(52) U.S. Cl.
CPC .......... *G01F 23/284* (2013.01); *B65D 90/48* (2013.01); *G01S 7/03* (2013.01); *G01S 13/88* (2013.01); *H01Q 1/225* (2013.01)

(58) Field of Classification Search
CPC ................................. B65D 90/48; G01S 7/03
USPC .......................................................... 342/124
See application file for complete search history.

(56) References Cited

U.S. PATENT DOCUMENTS

| | | | | |
|---|---|---|---|---|
| 6,690,320 B2* | 2/2004 | Benway | ................ | G01F 23/284 324/332 |
| 6,856,142 B2* | 2/2005 | Schroth | ................ | G01F 23/284 324/644 |
| 2004/0017200 A1* | 1/2004 | Reimelt | ................ | G01F 23/284 324/439 |
| 2007/0200749 A1* | 8/2007 | McEwan | ................ | G01F 23/284 342/124 |
| 2009/0229359 A1* | 9/2009 | Reimelt | ................ | G01F 23/284 73/304 R |
| 2013/0009803 A1* | 1/2013 | Edvardsson | .......... | G01F 23/284 342/124 |
| 2013/0127156 A1* | 5/2013 | Osswald | ............... | G01F 23/284 285/192 |
| 2014/0085133 A1* | 3/2014 | Flasza | ................... | G01F 23/284 342/124 |

(Continued)

OTHER PUBLICATIONS

Communication (Search Report) from European Patent Application No. 16166012.1, dated Jan. 3, 2017.

*Primary Examiner* — Marcus E Windrich
(74) *Attorney, Agent, or Firm* — Westman, Champlin & Koehler, P.A.

(57) ABSTRACT

The present invention relates to a radar level gauge system for a tank having a tubular mounting structure. The radar level gauge system comprises a transceiver; a single conductor probe extending through the tubular mounting structure; an electrically conductive shielding structure radially spaced apart from the single conductor probe and extending along the single conductor probe inside the mounting structure; a connecting member extending radially from the shielding structure to electrically couple the shielding structure to the tank; and processing circuitry connected to the transceiver for determining the filling level.

17 Claims, 4 Drawing Sheets

(56) References Cited

U.S. PATENT DOCUMENTS

| | | | | |
|---|---|---|---|---|
| 2014/0266864 A1* | 9/2014 | Fredriksson | ............ | G01F 23/284 342/124 |
| 2015/0168201 A1* | 6/2015 | Cobianu | ............... | G01F 23/284 342/124 |
| 2015/0276460 A1* | 10/2015 | Georgescu | ............ | G01F 23/284 342/124 |

* cited by examiner

SINGLE CONDUCTOR PROBE RADAR LEVEL GAUGE SYSTEM AND METHOD FOR A TANK HAVING A TUBULAR MOUNTING STRUCTURE

TECHNICAL FIELD OF THE INVENTION

The present invention relates to a radar level gauge system comprising a single conductor probe, and to a method of installing a radar level gauge system comprising a single conductor probe at a tank having a tubular mounting structure extending substantially vertically upwards from a roof of the tank.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a transmission line probe acting as a waveguide. The probe is generally arranged to extend vertically from the top towards the bottom of the tank.

An electromagnetic transmit signal is generated by a transceiver and propagated by the probe towards the surface of the product in the tank, and an electromagnetic reflection signal resulting from reflection of the transmit signal at the surface is propagated back towards to the transceiver.

Based on the transmit signal and the reflection signal, the distance to the surface of the product can be determined.

The transmit signal is typically not only reflected at the impedance transition constituted by the interface between the tank atmosphere and the surface of the product, but at several other impedance transitions encountered by the transmit signal. In the case of a GWR-system, one such impedance transition typically occurs at the connection between the transceiver and the probe. The transceiver may be connected to the probe via a feed-through.

Such a feed-through is typically formed by a coaxial line having the probe as its inner conductor, the tank wall or a connection piece that is attached to the tank as its outer conductor, and a dielectric member provided between the inner and outer conductors.

Due to the combined need for a sufficiently mechanically strong inner conductor and a practical outer conductor diameter, a feed-through impedance much above about 50 $\Omega$ is seldom feasible. Hence, because of its structure, the impedance of the feed-through is generally similar to that of a typical coaxial cable, that is, about 50 $\Omega$.

A radar level gauge system is often mounted on a tubular mounting structure extending substantially vertically upwards from a roof of the tank. In some cases, the tubular mounting structure may instead extend substantially horizontally from a side wall of the tank. The tubular mounting structure, which is often referred to as a "nozzle" may be a pipe that is welded to the tank and fitted with a flange at its upper (outer) end to allow attachment of an instrument, such as a radar level gauge system, or a blind flange. The inner diameter of the tubular mounting structure may typically be between 0.1 and 0.2 m, and a typical length may be around 0.2 to 0.5 m. However, there may be a trend towards even longer tubular mounting structures, in particular on top of storage tanks for improving ergonomics for on-tank work.

In a tank arrangement comprising, for instance, a vertically extending tubular mounting structure (nozzle), the probe is typically mechanically connected to the tank at an upper end of the mounting structure, and passes through the mounting structure, past a lower end of the mounting structure, before entering the tank itself. At the upper end of the mounting structure, the probe may be electrically connected to the transceiver of the radar level gauge system through a feed-through that passes through the tank boundary.

For single conductor probes, sometimes also referred to as Goubau-probes, it has been found that propagation of the electromagnetic signal that is guided by the probe is affected by the tubular mounting structure, especially when the tubular mounting structure is relatively narrow and high (long).

Rather than having the properties of a surface waveguide, the single conductor probe inside the tubular mounting structure in effect acts like a coaxial transmission line with signal propagation properties depending on the dimensions of the tubular mounting structure. In particular, the impedance of the transmission line inside the tubular mounting structure may be in the order of 150 $\Omega$ and may vary between installations. Accordingly, there will be a first impedance step at the interface between the feed-through and inside the tubular mounting structure and a second impedance step at the lower end of the tubular mounting structure.

The relatively large impedance step (about 150 $\Omega$ to about 370 $\Omega$) at the lower end of the tubular mounting structure gives rise to multiple reflections between the impedance transition at the feed-through and the impedance transition at the lower end of the tubular mounting structure. Such multiple reflections might lead to additional echo signals, which may disturb the filling level measurement relatively far below the lower end of the tubular mounting structure.

According to U.S. Pat. No. 6,690,320, problems caused by the reflection at the end of a tubular mounting structure can be solved by providing a coaxial cable extension inside the tubular mounting structure until after the probe exits the tubular mounting structure, so that the probe with the coaxial extension has the same impedance as the feed line between the transceiver and the probe (about 50 $\Omega$).

SUMMARY OF THE INVENTION

In view of the above, a general object of the present invention is to provide for improved filling level determination using a single conductor probe extending through a tubular mounting structure at the top of the tank, and in particular reducing the influence of multiple reflections.

According to a first aspect of the present invention, it is therefore provided a radar level gauge system for determining a filling level of a product in a tank having a tubular mounting structure, the radar level gauge system comprising: a transceiver for generating, transmitting and receiving electromagnetic signals; a single conductor probe electrically connected to the transceiver via a feed-through arranged at a first end of the tubular mounting structure, the single conductor probe extending through the tubular mounting structure from the first end and past a second end of the mounting structure towards and into the product in the tank for guiding an electromagnetic transmit signal from the transceiver towards a surface of the product, and for returning an electromagnetic surface reflection signal resulting from reflection of the transmit signal at the surface back towards the transceiver; an electrically conductive shielding structure radially spaced apart from the single conductor probe and extending along the single conductor probe inside the mounting structure; a connecting member extending radially from the shielding structure to electrically connect the shielding structure to the tank; and processing circuitry connected to the transceiver for determining the filling level based on the transmit signal and the surface reflection signal.

The tank may be any container or vessel capable of containing a product. In particular, the tank may be at least partly metallic, so as to provide a grounding for the electrically conductive shielding structure.

The "transceiver" may be one functional unit capable of transmitting and receiving electromagnetic signals, or may be a system comprising separate transmitter and receiver units.

The single conductor probe may be essentially rigid or flexible and may be made from metal, such as stainless steel.

It should be understood that the connecting member may be attached to the shielding structure through any attachment means, or be integrally formed with the shielding structure.

In many applications, the tubular mounting structure may extend vertically upwards from the roof of the tank. In such cases, the above-mentioned first end of the tubular mounting structure is an upper end of the tubular mounting structure, and the above-mentioned second end of the tubular mounting structure is a lower end of the tubular mounting structure.

In other applications, the tubular mounting structure may extend horizontally from a side wall of the tank. The above described multiple reflections may occur regardless of the orientation of the tubular mounting structure.

The present invention is based on the realization that it is not sufficient to only provide a shielding structure between the probe and the inner wall of the tubular mounting structure, but that an electrical connection needs to be established between the shielding structure and the tank, for example via the inner wall of the tubular mounting structure. If this is not done, the present inventor has found that current flowing on the outer surface of the shielding structure will result in a substantial double bounce, which may disturb the filling level measurement as described in the Background section.

In embodiments of the present invention, regardless of the extension of the shielding structure from the feed-through at the first end of the tubular mounting structure and the location of the connecting member along the shielding structure, the measurement situation will be improved as compared to prior art solutions where an outer conductor of a coaxial extension is not electrically connected to the tank below the feed-through.

The shielding structure and connecting member according to embodiments of the present invention are expected to be relatively easy to install and adapt to different dimensions of the tubular mounting structure, even as an addition to existing radar level gauge installations.

According to embodiments of the radar level gauge system of the present invention, the shielding structure may extend inside the tubular mounting structure from the first end of the tubular mounting structure and more than half of a distance from the first end to the second end of the tubular mounting structure. In embodiments with a remaining double bounce echo signal resulting from a double bounce between the end of the shielding structure and the second end of the tubular mounting structure, this echo signal will be less likely to interfere with filling level measurements, since the apparent distance corresponding to the double bounce echo signal will be reduced as compared to both the situation without shielding structure and the situation with a shielding structure but without connecting member.

Furthermore, the connecting member may be arranged at a connection location between the first end and the second end of the tubular mounting structure and be electrically connected to the inner wall of the tubular mounting structure at the connection location.

To provide for a reduced influence of the above-mentioned double bounce signal, the connection location may advantageously be closer to the second end of the tubular mounting structure than to the first end of the tubular mounting structure. To even further reduce the influence of the above-mentioned double bounce signal, the connecting member may be arranged so that a distance between the connection location and the second end of the tubular mounting structure is less than one quarter of a distance between the connection location and the first end of the tubular mounting structure.

In embodiments, the shielding structure may advantageously be tubular. For instance, the shielding structure may be a metallic tube having a circular cross-section. It should, however, be noted that the shielding structure may, in principle, have any cross-section. Furthermore, the shielding structure need not necessarily completely enclose the single conductor probe. For instance, the shielding structure may be provided in the form of a metal tube having a longitudinal slit. According to embodiments, such a slit may be wider than a diameter of the single conductor probe to facilitate mounting of the shielding structure around an existing probe.

Furthermore, the connecting member may be releasably attached to the shielding structure, to allow adaptation of the radar level gauge system according to embodiments of the present invention to tanks with different tubular mounting structures.

The electrical connection between the shielding structure and the tank may be a conductive electrical connection or a capacitive connection. The connecting member may advantageously be conductively connected to the shielding structure. For example, both the shielding structure and the connecting member may be made of metal, and may be in metallic contact with each other.

Furthermore, regardless of whether the electrical connection between shielding structure and connecting member is conductive or capacitive, the electrical connection between the connecting member and the tank may advantageously be a capacitive electrical connection. It is expected that it will be easier in practice to achieve a stable (not varying over time) capacitive electrical connection between the connecting member and the tank (preferably the inner wall of the tubular mounting structure) than to achieve a stable (not varying over time) conductive (galvanic) electrical connection. This is particularly the case for the typical frequency range of the electromagnetic transmit signal (GHz).

According to various embodiments, the connecting member may comprise a metallic portion and a dielectric portion arranged to prevent conductive connection between the metallic portion and the inner wall of the tubular mounting structure. Hereby, a stable impedance between the shielding structure and the tank (the inner wall of the tubular mounting structure) is provided for.

To provide for a sufficiently good electrical connection between the shielding structure and the inner wall of the tubular mounting structure, while still allowing the use of suitable dielectric materials, such as PTFE or similar (and/or air), the connecting member may be dimensioned in relation to the tubular mounting structure in such a way that the capacitance of the capacitor formed by the connecting member and the tubular mounting structure is at least about 8 pF. For typical dimensions of the tubular mounting structure, this may be achieved by configuring the connecting member in such a way that the metallic portion of the connecting member is spaced apart from the inner wall of the tubular mounting structure by less than 5 mm.

According to various embodiments, furthermore, the shielding structure may be configured in such a way that an impedance of a probe shielding structure arrangement comprising the probe and the shielding structure differs from an impedance of the feed-through by less than 20% of the impedance of the feed-through. This will significantly further reduce the above-mentioned double bounce signal.

According to various embodiments of the present invention, the radar level gauge system may additionally comprise at least one dielectric spacer arranged between the single conductor probe and an inner surface of the shielding structure for preventing unwanted contact between the single conductor probe and the shielding structure. The at least one dielectric spacer may be attached to the single conductor probe.

Advantageously, the dielectric spacer may be configured to provide a first reflection and a second reflection that substantially cancel out each other to provide for a very small total reflection from the spacer.

For instance, the dielectric spacer may have an extension along the single conductor probe of about one half center wavelength of the transmit signal. Alternatively, the spacer may comprise a first spacer part and a second spacer part, which are spaced apart along the single conductor probe about one quarter center wavelength of the transmit signal. To further reduce the total reflection, the spacer may comprise further spacer parts, where each is spaced apart from adjacent spacer part(s) by about one quarter center wavelength of the transmit signal.

According to embodiments of the present invention, the impedance transition at the end of the shielding structure has a known magnitude and occurs at a known position along the single conductor probe, which makes it feasible to handle effects of this impedance transition in software.

Hence, the processing circuitry comprised in the radar level gauge system according to embodiments of the present invention may advantageously comprise signal processing circuitry for forming an echo signal based on the transmit signal and the reflection signal, and removing an echo resulting from the above-described double bounce.

Moreover, the radar level gauge system according to various embodiments of the present invention may advantageously be comprised in a tank arrangement, further comprising a tank having a tubular mounting structure extending substantially vertically upwards from a roof of the tank.

According to a second aspect of the present invention, it is provided a radar level gauge system for determining a filling level of a product in a tank having a tubular mounting structure extending substantially vertically upwards from a roof of the tank, the radar level gauge system comprising: a measurement unit comprising: a transceiver for generating, transmitting and receiving electromagnetic signals; and processing circuitry connected to the transceiver for determining the filling level based on the transmitted and received electromagnetic signals; a single conductor probe electrically connected to the transceiver via a feed-through to extend substantially vertically through the tubular mounting structure past a lower end of the mounting structure towards and into the product in the tank for guiding an electromagnetic transmit signal from the transceiver towards a surface of the product, and for returning an electromagnetic surface reflection signal resulting from reflection of the transmit signal at the surface back towards the transceiver; an electrically conductive tubular shielding structure radially spaced apart from the single conductor probe for extending along the single conductor probe inside the mounting structure; and a plurality of electrically conductive connecting members for electrically connecting the shielding structure to an inner wall of the tubular mounting structure, each of the connecting members being attachable to the shielding structure, and having a different radial extension to allow adaptation of the radar level gauge system to tubular mounting structures with different inner diameters.

The dimensions of tubular mounting structures (nozzles) provided on existing tanks have generally not been standardized. As a result, different tanks may be provided with nozzles with different nozzle lengths and/or inner diameters.

The radar level gauge system according to embodiments of the present second aspect of the invention can be installed at practically any existing tank having a tubular mounting structure (nozzle), due to the provision of a suitable set of connecting members having different outer dimensions.

Further effects and variations of the present second aspect of the invention are largely similar to those described above with reference to the first aspect of the invention.

According to a third aspect of the present invention, it is provided a method of installing at a tank having a tubular mounting structure extending substantially vertically upwards from a roof of the tank, a radar level gauge system comprising: a measurement unit including a transceiver and processing circuitry; and a single conductor probe electrically connected to the transceiver of the measurement unit, the method comprising the steps of: arranging an electrically conductive tubular shielding structure around the single conductor probe; determining at least a diameter of the tubular mounting structure; selecting an electrically conductive connecting member among a plurality of connecting members, each being attachable to the tubular shielding structure and having mutually different radial extensions; attaching the selected connecting member to the tubular shielding structure; and arranging, inside the tubular mounting structure, the single conductor probe, shielded by the tubular shielding structure with the selected connecting member attached thereto.

In addition, the length of the tubular mounting structure may be measured, and the shielding structure may be shortened to a length similar to the length of the tubular mounting structure, if applicable.

Further effects and variations of the present third aspect of the invention are largely similar to those described above with reference to the first and second aspects of the invention.

In summary, the present invention thus relates to a radar level gauge system for a tank having a tubular mounting structure. The radar level gauge system comprises a transceiver; a single conductor probe extending through the tubular mounting structure; an electrically conductive shielding structure radially spaced apart from the single conductor probe and extending along the single conductor probe inside the mounting structure; a connecting member extending radially from the shielding structure to electrically couple the shielding structure to the tank; and processing circuitry connected to the transceiver for determining the filling level.

BRIEF DESCRIPTION OF THE DRAWINGS

These and other aspects of the present invention will now be described in more detail, with reference to the appended drawings illustrating at least one example embodiment of the invention, wherein:

FIG. 1b is a schematic illustration of the measurement electronics unit comprised in the radar level gauge system in FIG. 1a;

FIG. 2b schematically shows echo curves resulting from tests carried out with and without the connecting member in FIG. 2a;

DETAILED DESCRIPTION OF AN EXAMPLE EMBODIMENT OF THE INVENTION

In the present detailed description, an exemplary embodiment of the radar level gauge system and tank arrangement according to the present invention is discussed with reference to a tank comprising a tubular mounting structure (nozzle) extending vertically from the roof of the tank. Furthermore, the single conductor transmission line probe described herein is a flexible wire probe (a relatively pliable probe) kept straight in the tank by means of a weight. Additionally, the connecting member is mainly described as a detachable sleeve.

It should be noted that this by no means limits the scope of the present invention, which is equally applicable to other radar level gauge systems, such as a radar level gauge system in which a flexible wire probe is kept straight by other means, such as by fastening the wire probe at the bottom of the tank, or a radar level gauge system having a rigid rod-like single conductor transmission line probe. Moreover, the tubular mounting structure need not extend vertically, but may, for instance, extend substantially horizontally to provide access to the interior of the tank from the side of the tank. Also, the connecting member may be provided in a different form, as long as the intended function is fulfilled, that is, to electrically couple the shielding structure to the tank to reduce reflections traveling along the shielding structure.

Figure 1A:
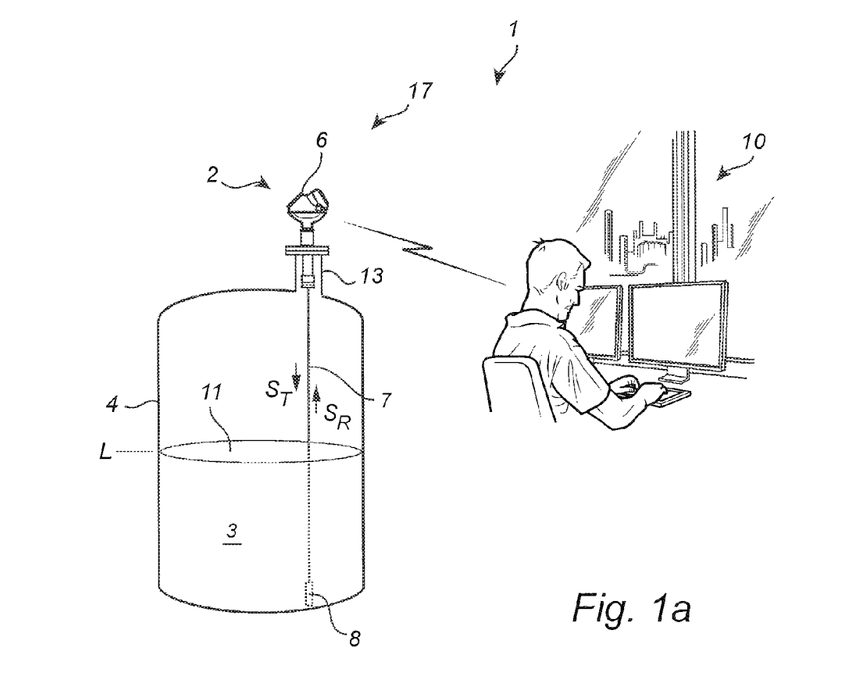
FIG. 1a schematically illustrates an exemplary tank arrangement comprising a radar level gauge system according to an embodiment of the present invention.

FIG. 1a schematically shows a level measuring system 1 comprising a tank arrangement 17 according to an example embodiment of the present invention, and a host system 10 illustrated as a control room.

The tank arrangement 17 comprises a radar level gauge system 2 of GWR (Guided Wave Radar) type and a tank 4 having a tubular mounting structure 13 (often referred to as a "nozzle") extending vertically from the roof of the tank 4.

The radar level gauge system 2 is installed to measure the filling level of a product 3 contained in the tank 4. Referring to FIG. 1a, the radar level gauge system 2 comprises a measurement unit 6 and a propagation device in the form of a single conductor probe 7 extending from the measurement unit 6, through the tubular mounting structure 13, towards and into the product 3. In the example embodiment in FIG. 1a, the single conductor probe 7 is a wire probe, that has a weight 8 attached at the end thereof to keep the wire straight and vertical.

By analyzing transmitted signals $S_T$ being guided by the probe 7 towards the surface 11 of the product 3, and reflected signals $S_R$ traveling back from the surface 11, the measurement unit 6 can determine the distance between a reference position (such as a feed-through between the outside and the inside of the tank) and the surface 11 of the product 3, whereby the filling level can be deduced. It should be noted that, although a tank 4 containing a single product 3 is discussed herein, the distance to any material interface along the probe can be measured in a similar manner.

Figure 1B:
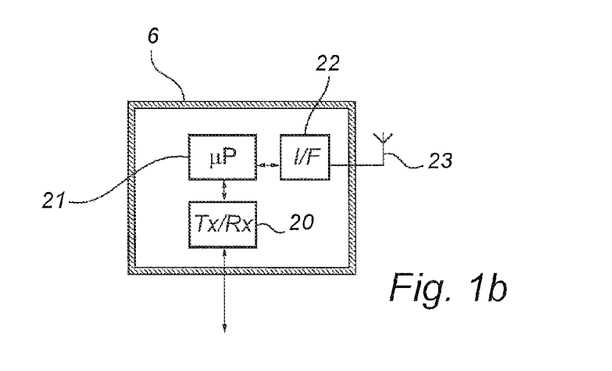

As is schematically illustrated in FIG. 1b, the measurement unit 6 comprises a transceiver 20, processing circuitry 21, a communication interface 22, and a communication antenna 23 for wireless communication with the control room 10.

The transceiver 20 is configured to generate, transmit and receive electromagnetic signals, the processing circuitry 21 is connected to the transceiver 20 and configured to determine the filling level L of the product 3 based on the transmit signal $S_T$ and the reflection signal $S_R$. The communication interface 22 is connected to the processing circuitry 21 and configured to allow communication with the host system 10 via the communication antenna 23. In the example embodiment of FIGS. 1a-b, the communication between the radar level gauge system 2 and the host system 10 is indicated as being wireless communication. Alternatively, communication may, for example, take place over an analog and/or digital wire-based communication channel. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, using the HART protocol.

Moreover, although not shown in FIG. 1b, the radar level gauge system 2 may be provided with a local energy store. Alternatively, or in combination, the radar level gauge system may be connected to an external power source through dedicated power lines or through communication lines such as the above-mentioned two-wire current loop.

Figure 2A:
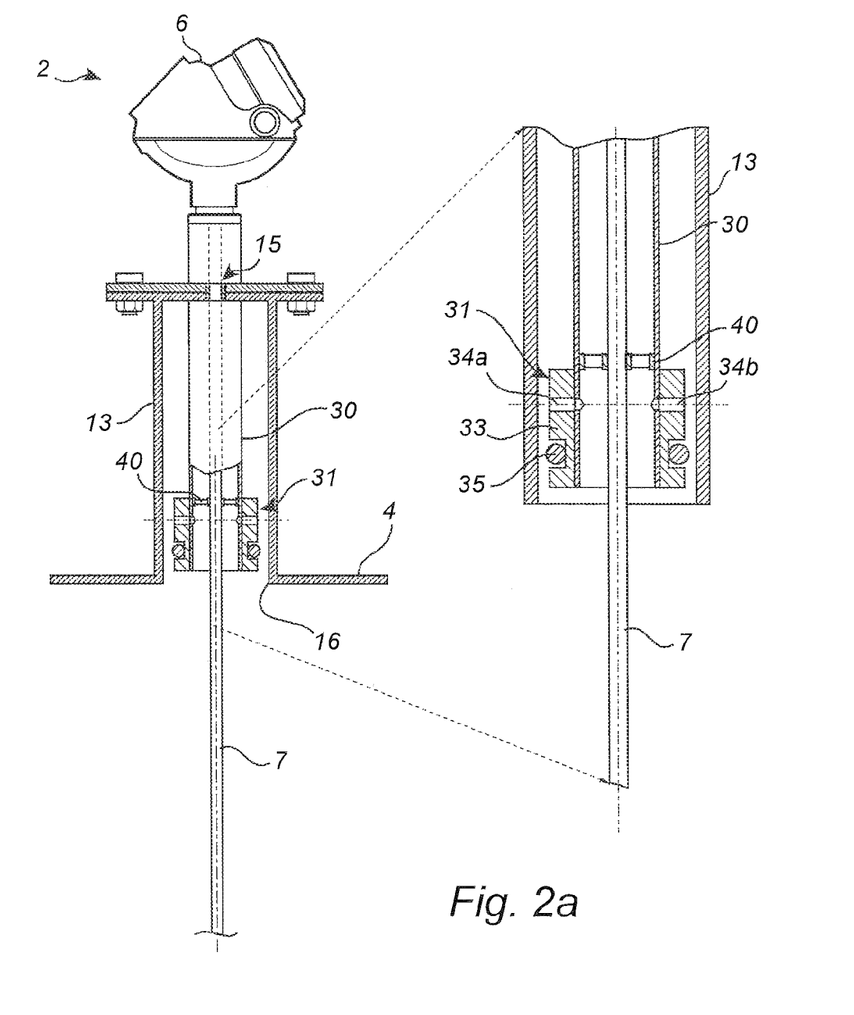
FIG. 2a is a schematic and partly opened side view of the radar level gauge system in fig 1a with an enlarged cross-section view of the bottom portion of the shielding structure to illustrate the electrical coupling between the shielding structure and the inner wall of the tubular mounting structure of the tank.

Referring to FIG. 2a, the top portion of the tank arrangement 17 in FIG. 1a will now be described in greater detail. As is schematically shown in FIG. 2a, the radar level gauge system 2 comprises an electrically conductive shielding structure 30 radially spaced apart from the single conductor probe 7 and extending along the single conductor probe 7 inside the tubular mounting structure 13, from the feed-through 15 at the first, upper end of the tubular mounting structure 13 towards the second, lower end 16 of the tubular mounting structure 13. The radar level gauge system 2 further comprises a connecting member 31 extending radially from the shielding structure 30 to electrically couple the shielding structure to the tank 4. In the example embodiment of the radar level gauge system 2 shown in FIG. 2a, the electrically conducting shielding structure 30 is provided in the form of a metallic tube having a circular cross-section, and the connecting member 31 comprises a metallic sleeve 33 having an inner diameter that is adapted to the outer diameter of the shielding structure 30. As is indicated in FIG. 2a, the metallic sleeve 33 of the connecting member 31 is attached and electrically conductively coupled to the shielding structure 30 by releasable fasteners, here shown in the form of set screws 34a-b fitting in corresponding holes in the shielding structure 30. The metallic sleeve 33 is dimensioned in relation to the inner diameter of the tubular mounting structure 13 so that there is a gap between the outer, in the radial direction, surface of the metallic sleeve 33 and the inner wall of the tubular mounting structure 13. To provide for a sufficient capacitive coupling between the shielding structure 30 and the tank 4, via the connecting member 31, the metallic sleeve 33 of the connecting member may advantageously be dimensioned such that the spacing between the outer surface of the metallic sleeve 33 and the inner wall of the tubular mounting structure 13 is less than 5 mm. To prevent unwanted metallic contact between connecting member 31 and the tank 4, the connecting member may comprise a dielectric spacer, such as the ring-shaped spacer 35 shown in FIG. 2a. Alternatively, a portion of the radially outer surface or the entire radially outer surface of the metallic sleeve 33 may be covered by a dielectric layer. A suitable material for the dielectric spacer 35 (or a dielectric layer covering the metallic sleeve 33) may be PTFE or similar, depending on the application (properties of the product in the tank, temperature, pressure etc.). It will be straight-forward for one of ordinary skill in the field of tank gauging to select a suitable dielectric material.

To prevent unwanted contact between the probe 7 and the shielding structure 30, the probe 7 may be provided with at least one spacer 40, which may, for instance, be made of PTFE or a suitable ceramic material. To reduce unwanted reflection, several spacers may be mutually spaced apart along the probe 7 a distance corresponding to one quarter of a center wavelength of the transmit signal.

As was described above in the Summary section, an important realization underlying the present invention is that the transmitted electromagnetic signals should, as far as possible, be prevented from returning towards the measurement unit along (guided by) the shielding structure. According to embodiments of the present invention, this is achieved through the provision of the connecting member electrically coupling the shielding structure to the metallic tank 4.

Figure 2B:
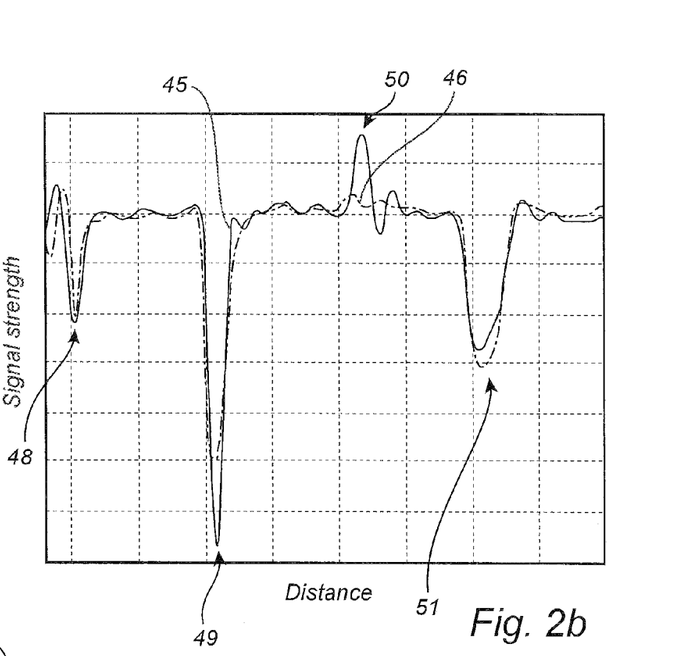

The effectiveness of embodiments of the present invention is illustrated in FIG. 2b by a schematic representation of measured echo curves (for example time-expanded representations of the reflection signals $S_R$) for the radar level gauge system configuration in FIG. 2a with and without connecting member, respectively.

Referring to FIG. 2b, a first echo curve 45 is indicated by a solid line, and a second echo curve 46 is indicated by a dash-dot line. Both the first 45 and the second 46 echo curves include a fiducial echo 48, an end-of-nozzle echo 49, a double bounce echo 50 and an end-of-probe echo 51. It should be noted that there was no product in the tank 4 when the measurements resulting in the echo curves of FIG. 2b were carried out.

It should also be noted that the echo curves in FIG. 2b were obtained in the simplified situation where the lower end of the shielding structure 30 substantially coincides with the lower end 16 of the tubular mounting structure 13. When this is not the case, a more complex situation with multiple double bounce echoes will arise.

The fiducial echo 48 results from reflection of the transmit signal at the impedance transition between the feed-through impedance (typically 50 Ω) and the impedance of the probe-shielding structure arrangement (in this particular case 68 Ω). The end-of-nozzle echo 49 results from reflection of the transmit signal at the impedance transition at the end of the tubular mounting structure 13 (and at the end of the shielding structure 30). The impedance below the tubular mounting structure is typically about 370 Ω. The double bounce echo 50 corresponds to a signal that is reflected at the impedance transition at the end of the nozzle 13/end of the shielding structure 30, then at the impedance transition at the feed-through 15, and finally again at the impedance transition at the end of the nozzle 13/end of the shielding structure 30 before being received by the transceiver 20.

As is clear from a comparison between the first echo curve 45 and the second echo curve 46, the magnitude of the end-of-nozzle echo 49 is considerably reduced through the provision of the connecting member 31. Due to the prevention or at least drastic reduction in the current flowing on the outside of the shielding structure, the double bounce echo 50 is almost completely eliminated in the second echo curve 46.

The magnitude of the double bounce echo 50 can be even further reduced by a better matching of the probe-shielding structure impedance to the impedance of the feed-through 15.

Tubular mounting structures provided on existing tanks may have widely varying dimensions, both the inner diameter and the length of the tubular mounting structure may be different from tank to tank. To accommodate tanks with existing tubular mounting structures (nozzles), an aspect of the present invention provides a radar level gauge system that is adaptable to different nozzle dimensions. An example of such a radar level gauge system will now be described with reference to FIG. 3.

Figure 3:
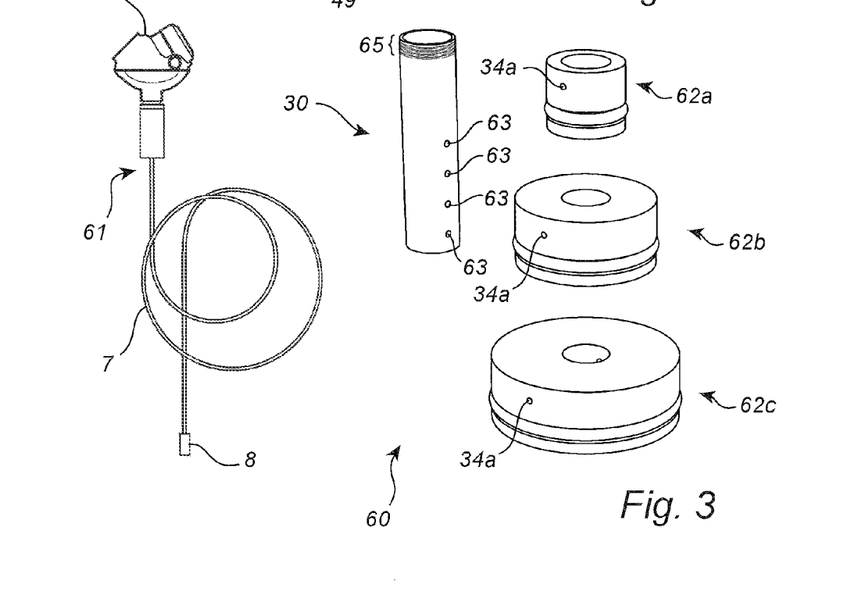
FIG. 3 schematically shows a radar level gauge system for installation in tanks with different nozzle dimensions.

As is shown in FIG. 3, the radar level gauge system 60 comprises a radar level gauge 61 including the above-described measurement unit 6, probe 7 and weight 8. The radar level gauge system 60 further comprises a shielding structure 30, here in the form of a stainless steel tube, and a plurality of connecting members 62a-c with different outer diameters. As is schematically indicated in FIG. 3, each connecting member 62a-c is provided with the above-described releasable fasteners 34a-b (only one of these is visible in FIG. 3), and the shielding structure 30 is equipped with corresponding holes (collectively denoted 63 in FIG. 3) for attachment and electrical connection of one of the connecting members 62a-c at different attachment locations along the shielding structure 30. As is indicated in FIG. 3, the shielding structure 30 is also provided with means for attaching the shielding structure to the radar level gauge 61. In the illustrative example in FIG. 3, the shielding structure 30 is provided with a threaded portion 65, and the radar level gauge comprises a matching threaded portion (not shown in FIG. 3).

According to an illustrative example, kits of parts including the radar level gauge 61, the shielding structure 30 and a plurality of different connecting members selected from the table below may be offered for sale.

| Nozzle inner diameter (mm) | Connecting member outer diameter (mm) | Min spacing (mm) | Max spacing (mm) |
| --- | --- | --- | --- |
| 38-44 | 36 | 1 | 4 |
| 44-50 | 42 | 1 | 4 |
| 50-56 | 48 | 1 | 4 |
| 56-62 | 54 | 1 | 4 |
| 62-68 | 60 | 1 | 4 |
| 68-74 | 66 | 1 | 4 |
| 74-80 | 72 | 1 | 4 |
| 80-86 | 78 | 1 | 4 |
| 86-92 | 84 | 1 | 4 |
| 92-98 | 90 | 1 | 4 |
| 98-104 | 96 | 1 | 4 |

In the table above, "min spacing" and "max spacing" refer to minimum and maximum spacing between the connecting member and the inner wall of the tubular mounting structure, respectively.

Figure 4:
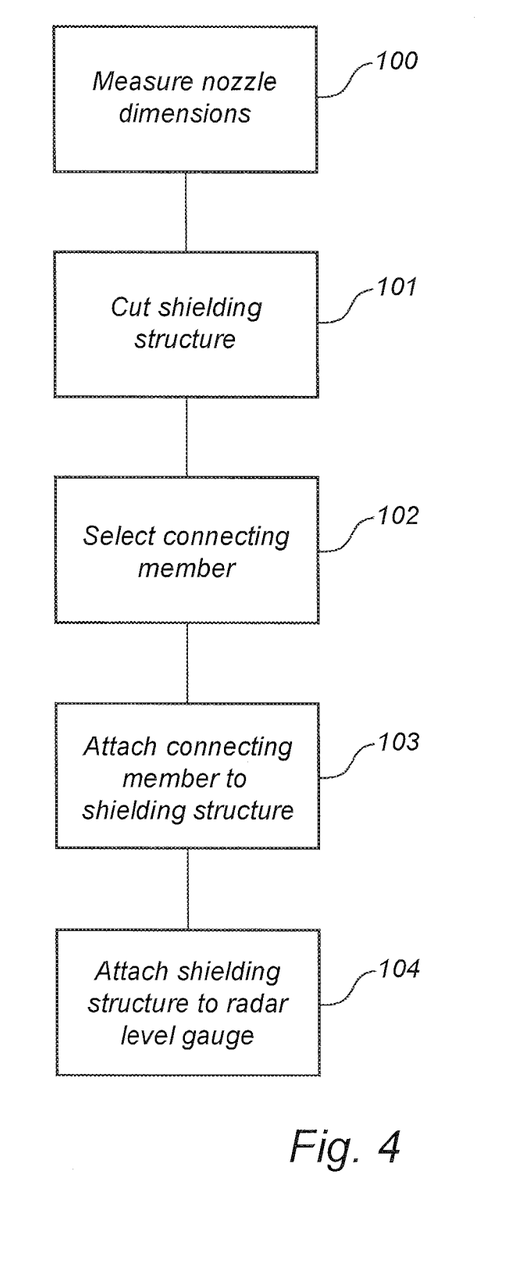
FIG. 4 is a flow chart illustrating a method according to an embodiment of the present invention.

Finally, an embodiment of the method according to the present invention will now be described with reference to the flow-chart in FIG. 4 and continued reference to FIG. 3.

In a first step 100, the dimensions (length and inner diameter) of the tubular mounting structure 13 are measured. Thereafter, in step 101, the shielding structure 30 is cut to a suitable length, which may suitably substantially correspond to the length of the tubular mounting structure. For instance, the shielding structure may be cut to end slightly above the second end of the tubular mounting structure when mounted. Subsequently, in step 102, a suitable connecting member is selected in accordance with the table above. In the next step 103, the selected connecting member is attached to the shielding structure 30, and finally, in step 104, probe 7 is inserted through the shielding structure 30 and the shielding structure is attached to the radar level gauge 61. Thereafter, the probe and shielding structure are ready to be inserted through the tubular mounting structure, and the radar level gauge can be attached to the tank.

The person skilled in the art realizes that the present invention by no means is limited to the preferred embodiments described above. On the contrary, many modifications and variations are possible within the scope of the appended claims. For instance, the connecting member may be an integral part of the shielding structure and/or may be pressed against the inner wall of the tubular mounting structure to provide conductive electrical coupling. Furthermore, it should be understood that various embodiments of the present invention are not limited to the use of a particular radar level gauging technology, such as using a pulsed transmit signal or FMCVV (frequency modulated continuous wave) techniques etc.

What is claimed is:

1. A radar level gauge system for determining a filling level of a product in a tank having a tubular mounting structure, the radar level gauge system comprising:
    a transceiver for generating, transmitting and receiving electromagnetic signals;
    a single conductor probe electrically connected to the transceiver via a feed-through arranged at a first end of the tubular mounting structure, the single conductor probe extending through the tubular mounting structure from the first end and past a second end of the mounting structure towards and into the product in the tank for guiding an electromagnetic transmit signal from the transceiver towards a surface of the product, and for returning an electromagnetic surface reflection signal resulting from reflection of the transmit signal at the surface back towards the transceiver;
    an electrically conductive shielding structure radially spaced apart from the single conductor probe and extending along the single conductor probe inside the mounting structure to an end of said shielding structure, wherein said single conductor probe extends beyond the end of said shielding structure towards and into the product;
    a connecting member extending radially from the shielding structure to electrically connect the shielding structure to the tank; and
    processing circuitry connected to the transceiver for determining the filling level based on the transmit signal and the surface reflection signal.

2. The radar level gauge system according to claim 1, wherein the connecting member electrically connects the shielding structure to the tank by electrically connecting the shielding structure to an inner wall of the tubular mounting structure.

3. The radar level gauge system according to claim 1, wherein the connecting member is arranged at a connection location between the first end and the second end of the tubular mounting structure.

4. The radar level gauge system according to claim 3, wherein the connection location is closer to the second end of the tubular mounting structure than to the first end of the tubular mounting structure.

5. The radar level gauge system according to claim 4, wherein a distance between the connection location and the second end of the tubular mounting structure is less than one quarter of a distance between the connection location and the first end of the tubular mounting structure.

6. The radar level gauge system according to claim 1, wherein the shielding structure extends inside the tubular mounting structure from the first end of the tubular mounting structure and more than half of a distance from the first end to the second end of the tubular mounting structure.

7. The radar level gauge system according to claim 1, wherein the shielding structure is tubular.

8. The radar level gauge system according to claim 1, wherein the connecting member is releasably attached to the shielding structure.

9. The radar level gauge system according to claim 1, wherein the connecting member is conductively connected to the shielding structure.

10. The radar level gauge system according to claim 2, wherein the connecting member is arranged and configured to electrically connect the shielding structure to the tank through capacitive coupling between the connecting member and the inner wall of the tubular mounting structure.

11. The radar level gauge system according to claim 10, wherein the connecting member comprises a metallic portion and a dielectric portion arranged to prevent conductive connection between the metallic portion and the inner wall of the tubular mounting structure.

12. The radar level gauge system according to claim 11, wherein the connecting member is dimensioned in relation to the tubular mounting structure in such a way that the metallic portion of the connecting member is spaced apart from the inner wall of the tubular mounting structure by less than 5 mm.

13. The radar level gauge system according to claim 1, wherein the shielding structure configured in such a way that an impedance of a probe shielding structure arrangement comprising the probe and the shielding structure differs from an impedance of the feed-through by less than 20% of the impedance of the feed-through.

14. The radar level gauge system according to claim 1, wherein the radar level gauge system further comprises at least one spacer arranged between the single conductor probe and an inner surface of the shielding structure for preventing unwanted electrical contact between the single conductor probe and the shielding structure.

15. A tank arrangement comprising:
    a tank having a tubular mounting structure extending substantially vertically upwards from a roof of the tank, the tank containing a product to be gauged; and
    the radar level gauge according to claim 1 attached to the tubular mounting structure.

16. A radar level gauge system for determining a filling level of a product in a tank having a tubular mounting structure extending substantially vertically upwards from a roof of the tank, the radar level gauge system comprising:

- a measurement unit comprising:
  - a transceiver for generating, transmitting and receiving electromagnetic signals; and
  - processing circuitry connected to the transceiver for determining the filling level based on the transmitted and received electromagnetic signals;
- a single conductor probe electrically connected to the transceiver via a feed-through to extend substantially vertically through the tubular mounting structure past a lower end of the mounting structure towards and into the product in the tank for guiding an electromagnetic transmit signal from the transceiver towards a surface of the product, and for returning an electromagnetic surface reflection signal resulting from reflection of the transmit signal at the surface back towards the transceiver;
- an electrically conductive tubular shielding structure radially spaced apart from the single conductor probe for extending along the single conductor probe inside the mounting structure to an end of said shielding structure, wherein said single conductor probe extends beyond the end of said shielding structure towards and into the product; and
- a plurality of electrically conductive connecting members for electrically connecting the shielding structure to an inner wall of the tubular mounting structure,
- each of the connecting members being attachable to the shielding structure, and having a different radial extension to allow adaptation of the radar level gauge system to tubular mounting structures with different inner diameters.

17. A method of installing, at a tank having a tubular mounting structure extending substantially vertically upwards from a roof of the tank, a radar level gauge system comprising:

- a measurement unit including a transceiver and processing circuitry; and
- a single conductor probe electrically connected to the transceiver of the measurement unit, the method comprising the steps of:
- arranging an electrically conductive tubular shielding structure around the single conductor probe;
- determining at least a diameter of the tubular mounting structure;
- selecting, based on said diameter of the tubular mounting structure, an electrically conductive connecting member among a plurality of connecting members, each being attachable to the tubular shielding structure and having mutually different radial extensions;
- attaching the selected connecting member to the tubular shielding structure; and
- arranging, inside the tubular mounting structure, the single conductor probe, shielded by the tubular shielding structure to an end of said shielding structure, wherein said single conductor probe extends beyond the end of said shielding structure towards and into the product with the selected connecting member attached thereto.

* * * * *